US011645559B2

(12) United States Patent
Yalla et al.

(10) Patent No.: US 11,645,559 B2
(45) Date of Patent: May 9, 2023

(54) METHODS AND APPARATUS FOR GENERATING ITEM RECOMMENDATIONS BASED ON REAL-TIME INFERENCE OF MACHINE LEARNING MODELS

(71) Applicant: Walmart Apollo, LLC, Bentonville, AR (US)

(72) Inventors: Surya Yalla, Santa Clara, CA (US); Kaushiki Nag, Sunnyvale, CA (US); Shirpaa Manoharan, Sunnyvale, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 306 days.

(21) Appl. No.: 17/017,114

(22) Filed: Sep. 10, 2020

(65) Prior Publication Data
US 2022/0076145 A1 Mar. 10, 2022

(51) Int. Cl.
*G06N 20/00* (2019.01)
*G06N 5/04* (2023.01)
*G06F 16/9535* (2019.01)

(52) U.S. Cl.
CPC ........... *G06N 5/04* (2013.01); *G06F 16/9535* (2019.01); *G06N 20/00* (2019.01)

(58) Field of Classification Search
CPC ... G06F 16/9535; G06F 16/5854; G06N 5/04; G06N 5/022; G06N 20/00; G06N 20/20; G06N 7/005; G06Q 30/0201; G06Q 30/0256; G06Q 30/0625; H04L 65/1069
See application file for complete search history.

(56) References Cited

U.S. PATENT DOCUMENTS

| | | | |
|---|---|---|---|
| 2016/0140519 A1* | 5/2016 | Trepca | G06N 7/005 705/26.44 |
| 2017/0236131 A1* | 8/2017 | Nathenson | G06Q 30/0201 705/26.7 |
| 2018/0232659 A1 | 8/2018 | Ranatunga et al. | |

(Continued)

OTHER PUBLICATIONS

Damien et al., "Advanced Customer Activity Prediction Based on Deep Hierarchic Encoder—Decoders", 2019, p. 1-7.

(Continued)

*Primary Examiner* — Le H Luu
(74) *Attorney, Agent, or Firm* — Morgan, Lewis & Bockius LLP; Manita Rawat

(57) ABSTRACT

This application relates to apparatus and methods for providing recommended items to advertise. In some examples, a computing device determines a plurality of first values for a corresponding plurality of first items based on the user's engagement with each of the first items. The computing device may then determine a subset of the plurality of first items based on the first values. The computing device may receive a search request and determine a plurality of second values for a plurality of second items based on the search request. The computing device may determine a plurality of third values for the subset of items based on the plurality of second values for the plurality of second items and the user's engagement with each of the subset of items. The computing device may determine the recommended items based on the plurality of second values and the plurality of third values.

20 Claims, 8 Drawing Sheets

(56) References Cited

U.S. PATENT DOCUMENTS

| | | |
|---|---|---|
| 2019/0066130 A1 | 2/2019 | Shen et al. |
| 2020/0117884 A1 | 4/2020 | Adato et al. |
| 2021/0073593 A1* | 3/2021 | Aggarwal ............ G06F 16/5854 |
| 2021/0118020 A1* | 4/2021 | Agarwal ............ G06Q 30/0625 |
| 2021/0133851 A1* | 5/2021 | Chen .................. G06Q 30/0201 |
| 2021/0182287 A1* | 6/2021 | Agarwal ................ G06N 5/022 |
| 2021/0192568 A1* | 6/2021 | Taghavi Nasr Abadi ................... G06N 20/20 |
| 2021/0201351 A1* | 7/2021 | Nag ................... G06Q 30/0256 |
| 2021/0314523 A1* | 10/2021 | Kamisetty ........... H04L 65/1069 |

OTHER PUBLICATIONS

Zhou et al., "Deep Learning Model for Top-N Recommendation With Interests Exploring", IEE Access, 2018, p. 51440-51456.

* cited by examiner

METHODS AND APPARATUS FOR GENERATING ITEM RECOMMENDATIONS BASED ON REAL-TIME INFERENCE OF MACHINE LEARNING MODELS

TECHNICAL FIELD

The disclosure relates generally to digital item advertisements and, more specifically, to electronically generating item advertisement recommendations.

BACKGROUND

At least some websites, such as retailer websites, display item advertisements to customers. For example, the website may provide item advertisements for the customer to view on the website's homepage. The item advertisements may include an image of an item, and a price of the item, for example. The website may further allow the customer to purchase the advertised items. In some examples, item advertisement systems may generate the item advertisements based on algorithms, such as machine learning algorithms, that operate on historical data, such as a customer's previous purchase history. The algorithms may generate the item advertisements in advance of the customer visiting the website (e.g., offline). For example, item advertisement systems may train and run inference on machine learning models offline using historical data to determine item advertisements to be displayed to a customer the next time the customer visits a website.

In some examples, however, the item advertisements may not be relevant to the customer visiting the website. For example, the customer may visit the website with an intent to shop for one type of product, but may be shown item advertisements for a different type of product. Because the customer may not be interested in an advertised item, the customer may decide not to purchase the advertised item. As a result, a retailer may lose sales of items to a customer. For example, the customer may leave the website without having purchased an item that, if shown an advertisement for, the customer would have purchased. In some examples, if a customer perceives an item advertisement as irrelevant, the customer may go elsewhere, such as another website, to purchase an item that is relevant to the customer. As such, there are opportunities to improve the determination and generation of item advertisements.

SUMMARY

The embodiments described herein are directed to automatically generating item recommendations for digital item advertisements that may be displayed, for example, on a website. The embodiments may allow a person, such as a customer, to be presented with advertisements of items (e.g., products and services) that are more relevant to (e.g., likely to interest) the person.

For example, the embodiments may allow for real-time inferencing of machine learning models (e.g., algorithms) to generate the item recommendations. For example, the machine learning models may operate on real-time data, such as data identifying real-time user events on a website, to generate and provide item recommendations for digital item advertisements to display to the customer. The machine learning models may also operate on temporal data that may identify a current date (e.g., a date range), a current season (e.g., shopping season), and trend data that may identify current events (e.g., local current events) such as sporting events, festivals, weather changes, seasonal changes, or natural disasters, for example. Among other advantages, the embodiments may allow for the generation of item recommendations that are more relevant to a customer. For example, the item recommendations may be based, at least in part, on real-time customer interactions with a website. As such, the embodiments may leverage the intent of customers as they land on a website, as well as changing micro-intents as they navigate through the website.

Further, the embodiments may allocate processing tasks among a plurality of processing units, such as graphical processing units (GPUs), to increase processing efficiency. For example, the embodiments may allocate processing tasks associated with machine learning models or parts thereof to a plurality of GPUs to generate the item recommendations. As such, the embodiments may satisfy timing requirements associated with providing item recommendations. For example, the embodiments may generate and provide item recommendations for digital item advertisements to be displayed to a customer before a threshold amount of time defining a timing requirement. The threshold amount of time may be one required by a web server hosting the website, for example.

In some examples, a computing device determines a plurality of first values for a corresponding plurality of first items based on the user's engagement with each of the first items. The computing device may then determine a subset of the plurality of first items based on the first values. The computing device may receive a search request and determine a plurality of second values for a plurality of second items based on the search request. The computing device may determine a plurality of third values for the subset of items based on the plurality of second values for the plurality of second items and the user's engagement with each of the subset of items. The computing device may determine the recommended items based on the plurality of second values and the plurality of third values.

In some embodiments, a system comprises a processing unit. The processing unit is configured to receive user session data identifying website activities of a user from a web server, and to generate feature data based on at least the user session data for the user. Further, the processing unit is configured to provide a first portion of the feature data to at least one different processing unit to enable the generation of first output data based on the first portion of the feature data and the generation of second output data based on the second portion of the feature data. The processing unit is also configured to receive the first output data and the second output data from the at least one different processing unit, and to generate item recommendations based on the first output data and the second output data. The processing unit is further configured to transmit the item recommendations to the web server In some embodiments, a method by a processing unit includes receiving user session data identifying website activities of a user from a web server, and generating feature data based on at least the user session data for the user. The method also includes providing a first portion of the feature data to at least one different processing unit to enable the generation of first output data based on the first portion of the feature data and the generation of second output data based on the second portion of the feature data. Further, the method includes receiving the first output data and the second output data from the at least one different processing unit, and generating item recommendations based on the first output data and the second output data. Further, the method includes transmitting the item recommendations to the web server.

In yet other embodiments, a non-transitory computer readable medium has instructions stored thereon, where the instructions, when executed by at least one processor, cause a computing device to perform operations that include includes receiving user session data identifying website activities of a user from a web server, and generating feature data based on at least the user session data for the user. The operations also include providing a first portion of the feature data to at least one different processing unit to enable the generation of first output data based on the first portion of the feature data and the generation of second output data based on the second portion of the feature data. Further, the operations include receiving the first output data and the second output data from the at least one different processing unit, and generating item recommendations based on the first output data and the second output data. Further, the operations include transmitting the item recommendations to the web server.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
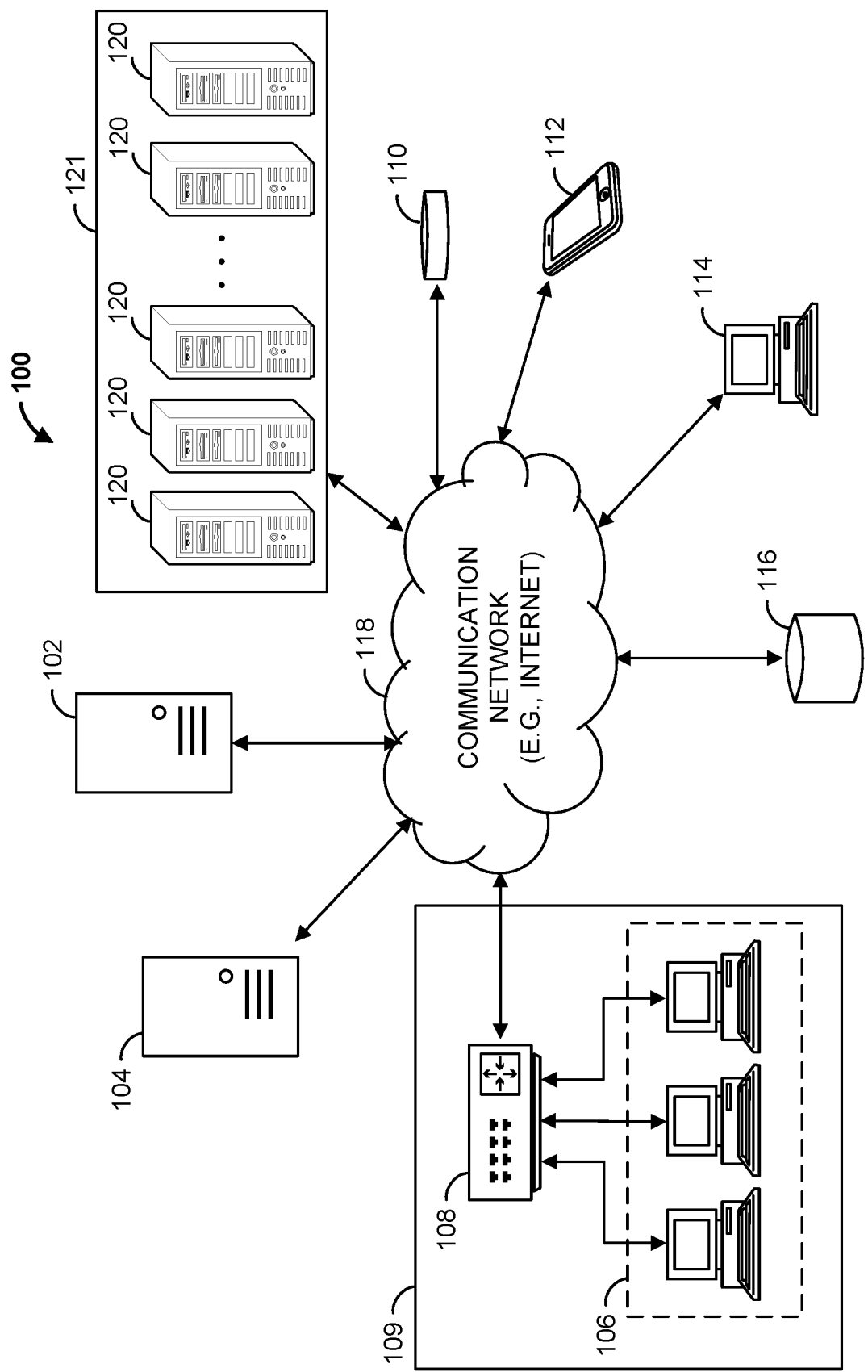
FIG. 1 is a block diagram of an item recommendation system that includes an item recommendation computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item recommendation system 100 that includes an item recommendation computing device 102 (e.g., a server, such as an application server), a web server 104, one or more processing devices 120, workstation(s) 106, database 116, and one or more customer computing devices 110, 112, 114 operatively coupled over network 118. Item recommendation computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of item recommendation computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to item recommendation computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, item recommendation computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with item recommendation computing device 102 over communication network 118. The workstation(s) 106 may send data to, and receive data from, item recommendation computing device 102. For example, the workstation(s) 106 may transmit data identifying items purchased by a customer at store 109 to item recommendation computing device 102.

Although FIG. 1 illustrates three customer computing devices 110, 112, 114, item recommendation system 100 can include any number of customer computing devices 110, 112, 114. Similarly, item recommendation system 100 can include any number of item recommendation computing devices 102, processing devices 120, workstations 106, web servers 104, and databases 116.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit user session data related to a customer's activity (e.g., interactions) on the website. For example, a customer may operate one of customer computing devices 110, 112, 114 to initiate a web browser that is directed to the website hosted by web server 104. The customer may, via the web browser, view item advertisements for items displayed on the website, and may click on item advertisements, for example. The website may capture these activities as user session data, and transmit the user session data to item recommendation computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to item recommendation computing device 102.

In some examples, item recommendation computing device 102 may execute one or more models (e.g., algorithms), such as a machine learning model, to determine recommended items to advertise to the customer (i.e., item recommendations). Item recommendation computing device 102 may transmit the item recommendations to web server 104 over communication network 118, and web server 104 may display advertisements for one or more of the recommended items on the website to the customer. For example, web server 104 may display the item advertisements to the customer on a homepage, a catalog webpage, an item webpage, or a search results webpage of the website (e.g., as the customer browses those respective webpages).

In some examples, web server 104 transmits a search request to item recommendation computing device 102. The search request may identify a search query provide by the customer (e.g., via a search bar of the web browser). In response to receiving the search request, item recommendation computing device 102 may execute the one or more to determine search results to display to the customer (i.e., item recommendations). Item recommendation computing device 102 may transmit search results to web server 104 over communication network 118. Web server 104 may display the search results on a search results webpage, for example.

Item recommendation computing device 102 is further operable to communicate with database 116 over communication network 118. For example, item recommendation computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item recommendation computing device 102, in some examples, database 116 can be a local storage device, such as a hard drive, a non-volatile memory, or a USB stick. Item recommendation computing device 102 may store purchase data received from web server 104 in database 116. Item recommendation computing device 102 may also receive from web server 104 user session data identifying events associated with browsing sessions, and may store the user session data in database 116.

In some examples, item recommendation computing device 102 generates feature vectors for a plurality of machine learning models based on historical user session data and purchase data for a plurality of users. Item recommendation computing device 102 trains the machine learning models based on their corresponding feature vectors, and item recommendation computing device 102 stores the trained machine learning models in a database, such as in database 116 (e.g., cloud storage).

The trained machine learning models, when executed by item recommendation computing device 102, allow item recommendation computing device 102 to determine item recommendations for one or more items to advertise to a customer. For example, item recommendation computing device 102 may obtain the trained machine learning models from database 116. Item recommendation computing device 102 may then receive, in real-time from web server 104, user session data identifying real-time events of the customer interacting with a website (e.g., during a browsing session). In response to receiving the user session data, item recommendation computing device 102 may execute the trained machine learning models to determine item recommendations for items to display to the customer.

In some examples, item recommendation computing device 102 receives user session data from web server 104. The user session data may identify actions (e.g., activity) the customer on a website. For example, the user session data may identify item impressions, item clicks, items added to an online shopping cart, conversions, click-through rates, advertisements viewed, and/or advertisements clicked during an ongoing browsing session (e.g., the user data identifies real-time events). Item recommendation computing device 102 may generate item recommendations based on the user session data. For example, item recommendation computing device 102 may determine tensor data required by each of a plurality of machine learning models, and generate the tensors (e.g., embedding vectors, feature vectors) for each of the plurality of machine learning models based at least on the user session data. In other words, item recommendation computing device 102 may generate the tensors in accordance with the input features expected by each machine learning model.

In some examples, the tensors are generated based on historical session data for the customer. For example, item recommendation computing device 102 may generate the tensors based on user session data for the ongoing browsing session, and historical session data and/or historical purchase data for the customer. In some examples, the tensors are generated on temporal data (e.g., a current date (e.g., a date range), a current season (e.g., shopping season)) and/or trend data (e.g., current events, sporting events, festivals, weather changes, seasonal changes, natural disasters, etc.). For example, item recommendation computing device 102 may generate the tensors based on user session data for the ongoing browsing session, and the trend data. In some examples, item recommendation computing device 102 generates the tensors based on user session data for the ongoing browsing session, historical session data for the customer, and trend data.

Item recommendation computing device 102 may provide the tensors as required by each machine learning model. The machine learning models may include, for example, neural networks, deep neural networks, decision tree models, regression models, random forest models, or any other suitable models.

For inferencing (e.g., model execution), item recommendation computing device 102 assigns the models (or parts thereof) to a plurality of processing units (e.g., GPUs). In some examples, item recommendation computing device 102 includes the processing units. For example, item recommendation computing device 102 may include one or more GPU clusters. Item recommendation computing device 102 may assign the models based on input requirements (e.g., expected feature data) of each model. For example, assuming a limited number of processing units, item recommendation computing device 102 may assign to a processing unit (e.g., GPU node) a first model that does not require an output of another model. When inference for that model is complete, item recommendation computing device 102 may assign to the same processing unit a second model that requires the output of the first model that executed. Based on the output of the plurality of models, item recommendation computing device 102 generates the item recommendations for the customer, and transmits the item recommendations to the web server 104. Web server 104 may then display advertisements for the recommended items to the customer.

In some examples, item recommendation computing device 102 assigns the models (or parts thereof) for execution to one or more processing devices 120. For example, each model may be assign to a virtual machine hosted by a processing device 120. The virtual machine may cause the models or parts thereof to execute on one or more processing units such as GPUs. In some examples, the virtual machines assign each model (or part thereof) among a plurality of processing units based on input requirements of each model, as described above. For example, a virtual machine may configure the GPUs such as to minimize the amount of time any GPU would need to wait for completion of another GPU's output data. When inference is complete, each virtual machine may provide the output of each model to item recommendation computing device 102.

Based on the output of the models, item recommendation computing device 102 may generate item recommendations for items to be advertised on the website. For example, item recommendation computing device 102 may transmit the item recommendations to web server 104, and web server 104 may display the recommend items to the customer.

In some examples, item recommendation computing device 102 may generate item recommendations for a customer based on the customer's location. Merely as an example, item recommendation computing device 102 may generate, for a customer with a "Sophisticated styled apparel" affinity when browsing the website from Seattle, item recommendations for sophisticated styled rain boots and raincoats. If the customer logs in from Texas, however, item recommendation computing device 102 may generate item recommendations for sophisticated styled summer clothing.

Among other advantages, the embodiments allow for real-time inferencing of multiple machine learning models to generate item recommendations for a particular customer. Distributing processing tasks amongst processing units, such as GPU nodes, allows for more consistent throughput consistency, as well as a reduction in overall processing time. Moreover, the distribution of processing tasks allows for the use of more computationally intensive models, such as neural networks, which can capture non-linear relationships from trained data and may be better suited to estimate relationships on unseen data (e.g., real-time data).

Figure 2:
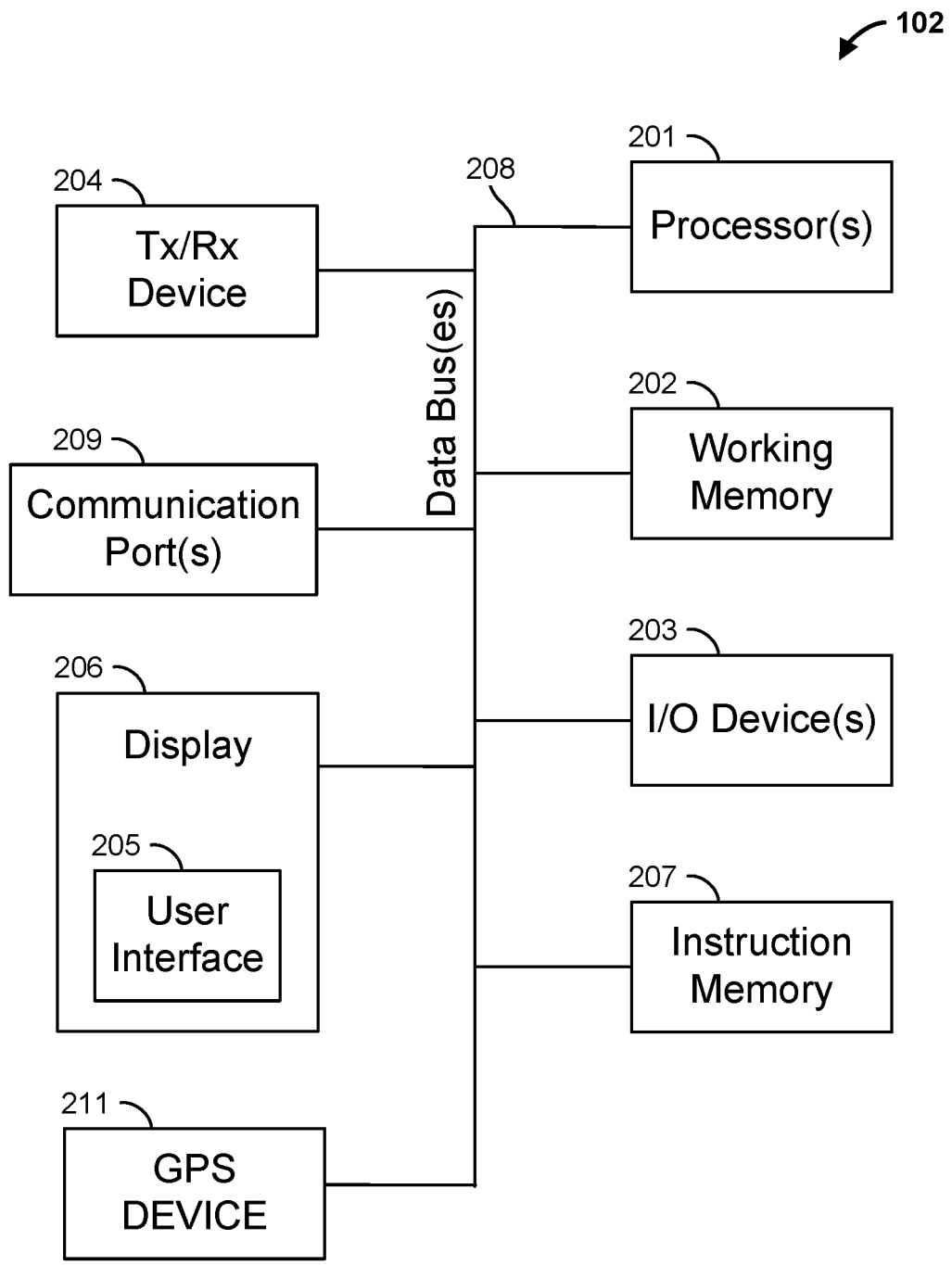
FIG. 2 is a block diagram of the item recommendation computing device of FIG. 1 in accordance with some embodiments.

FIG. 2 illustrates the item recommendation computing device 102 of FIG. 1. Item recommendation computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item recommendation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with item recommendation computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item recommendation computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, item recommendation computing device 102 may determine a local geographical area (e.g., town, city, state, etc.) of its position. Based on the geographical area, item recommendation computing device 102 may determine relevant trend data (e.g., trend data identifying events in the geographical area).

Figure 3:
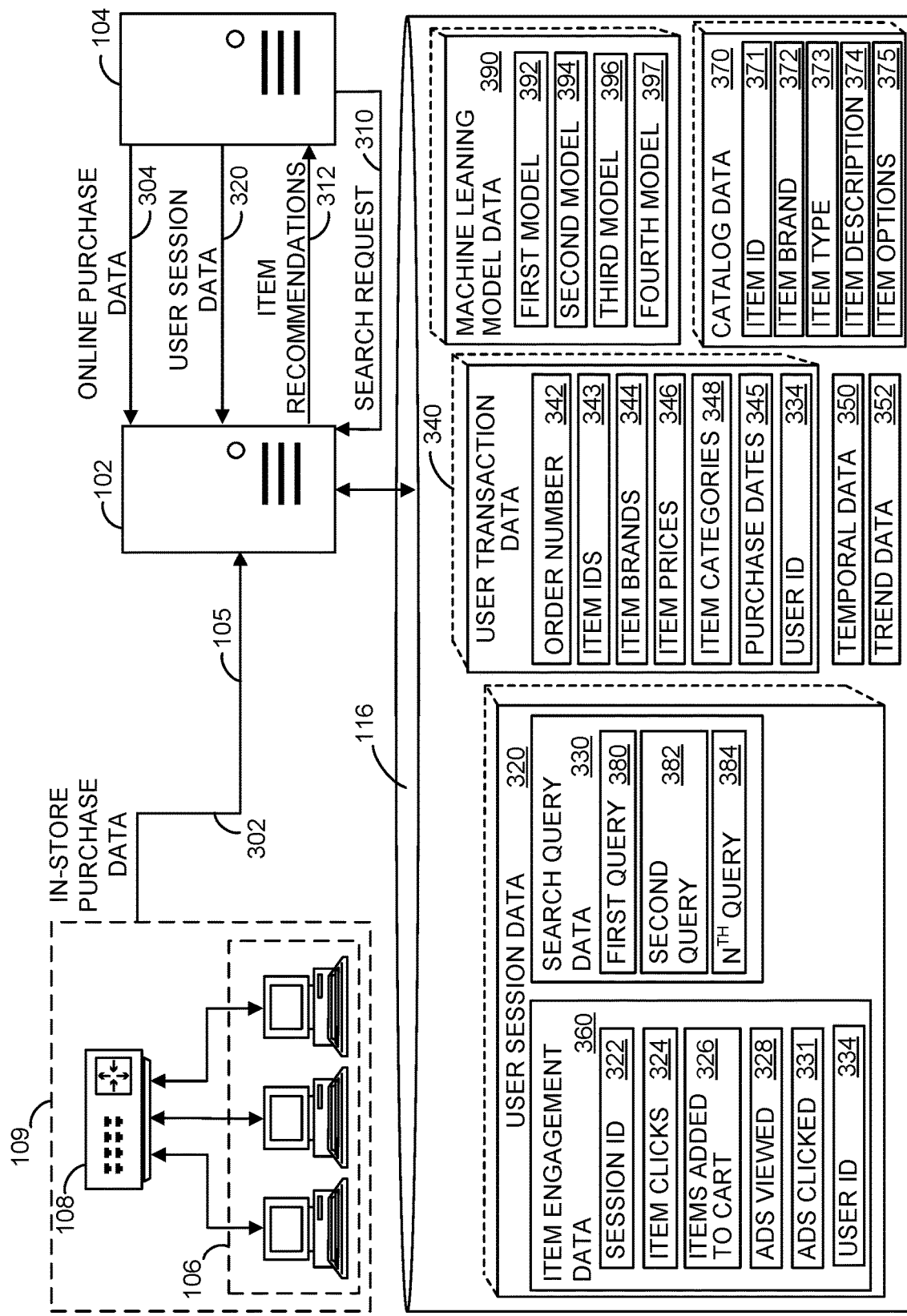
FIG. 3 is a block diagram illustrating various portions of the item recommendation system of FIG. 1 in accordance with some embodiments.

FIG. 3 is a block diagram illustrating examples of various portions of the item recommendation system 100 of FIG. 1. As indicated in the figure, item recommendation computing device 102 may receive user session data 320 from web server 104, and store user session data 320 in database 116. User session data 320 may identify, for each user (e.g., customer), data related to that user's browsing session, such as when browsing a retailer's webpage hosted by web server 104.

In this example, user session data 320 may include item engagement data 360 and/or search query data 330. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 331 identifying advertisements the user clicked on, and user ID 334 (e.g., a customer ID, retailer website login ID, a cookie ID, etc.).

Search query data 330 may identify one or more searches conducted by a user during a browsing session (e.g., a current browsing session). For example, item recommendation computing device 102 may receive a search request 310 from web server 104, where the search request 310 identifies one or more search terms provided by the user. Item recommendation computing device 102 may store the search terms as provided by the user as search query data 330. In this example, search query data 330 includes first query 380, second query 382, and $N^{th}$ query 384.

Item recommendation computing device 102 may also receive online purchase data 304 from web server 104, which identifies and characterizes one or more online purchases, such as purchases made by the user via a retailer's website hosted by web server 104. Item recommendation computing device 102 may also receive in-store purchase data 302 from store 109, which identifies and characterizes one or more in-store purchases.

Item recommendation computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item types 348 identifying a type (e.g., category) of each item purchased, a purchase date 345 identifying the purchase date of the purchase order, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

Database 116 may also store machine learning model data 390 identifying and characterizing one or more machine learning models. For example, machine learning model data 390 may include a first model 392, a second model 394, a third model 396, and a fourth model 397. Each of the first model 392, second model 394, third model 396, and fourth model 397 may be machine learning models trained based on corresponding tensors generated by item recommendation computing device 102.

Database 116 may further store temporal data 350 and trend data 352. Temporal data 350 may identify a current date (e.g., a date range), a current season (e.g., shopping season), or any other suitable time period. Trend data 352 may identify current events (e.g., local current events) such as sporting events, festivals, weather changes, seasonal changes, natural disasters.

In some examples, item recommendation computing device 102 receives (e.g., in real-time) user session data 320 for a customer interacting with a website hosted by web server 104. In response, item recommendation computing device 102 generates item recommendation 312 identifying recommended items to advertise to the customer, and transmits item recommendation 312 to web server 104.

For example, item recommendation computing device 102 may assign each of first model 392, second model 394, third model 396, and fourth model 397 (or parts thereof) to a different processing unit (e.g., GPU). In some examples, item recommendation computing device 102 assigns each of the first model 392, second model 394, third model 396, and fourth model 397 to virtual machines hosted by one or more processing devices 120. Moreover, item recommendation computing device 102 may generate tensors based at least on the received user session data 320 (e.g., the user session data 320 received in real-time) for the customer, as required by each of the first model 392, second model 394, third model 396, and fourth model 397. In some examples, item recommendation computing device 102 generates the tensors based on the received user session data 320, and one or more of the following: historical user session data 320 for the customer, historical user transaction data 340 for the customer, temporal data 350, and trend data 352, for each of the first model 392, second model 394, third model 396, and fourth model 397. Item recommendation computing device 102 may provide (e.g., transmit) the tensors to the processing units accordingly, and the processing units may execute the models based on the provided tensors (e.g., inferencing).

Further, item recommendation computing device 102 may obtain the output (e.g., output data, output tensors) of each of the first model 392, second model 394, third model 396, and fourth model 397 from the processing units, and generate the item recommendation 312 based on the outputs of the models. For example, item recommendation computing device 102 may combine (e.g., merge) the outputs according to a merging algorithm. The merging algorithm may, for example, assign a weight to each model output, and generate a ranking (e.g., item ranking) based on a combination of the weighted model outputs. In some examples, the merging algorithm identifies and characterizes a deep learning model, such as a ranking model given a recall set, which takes the output of the other deep learnt models (e.g., the output of the first model 392, second model 394, third model 396) and provides a result set.

Figure 4:
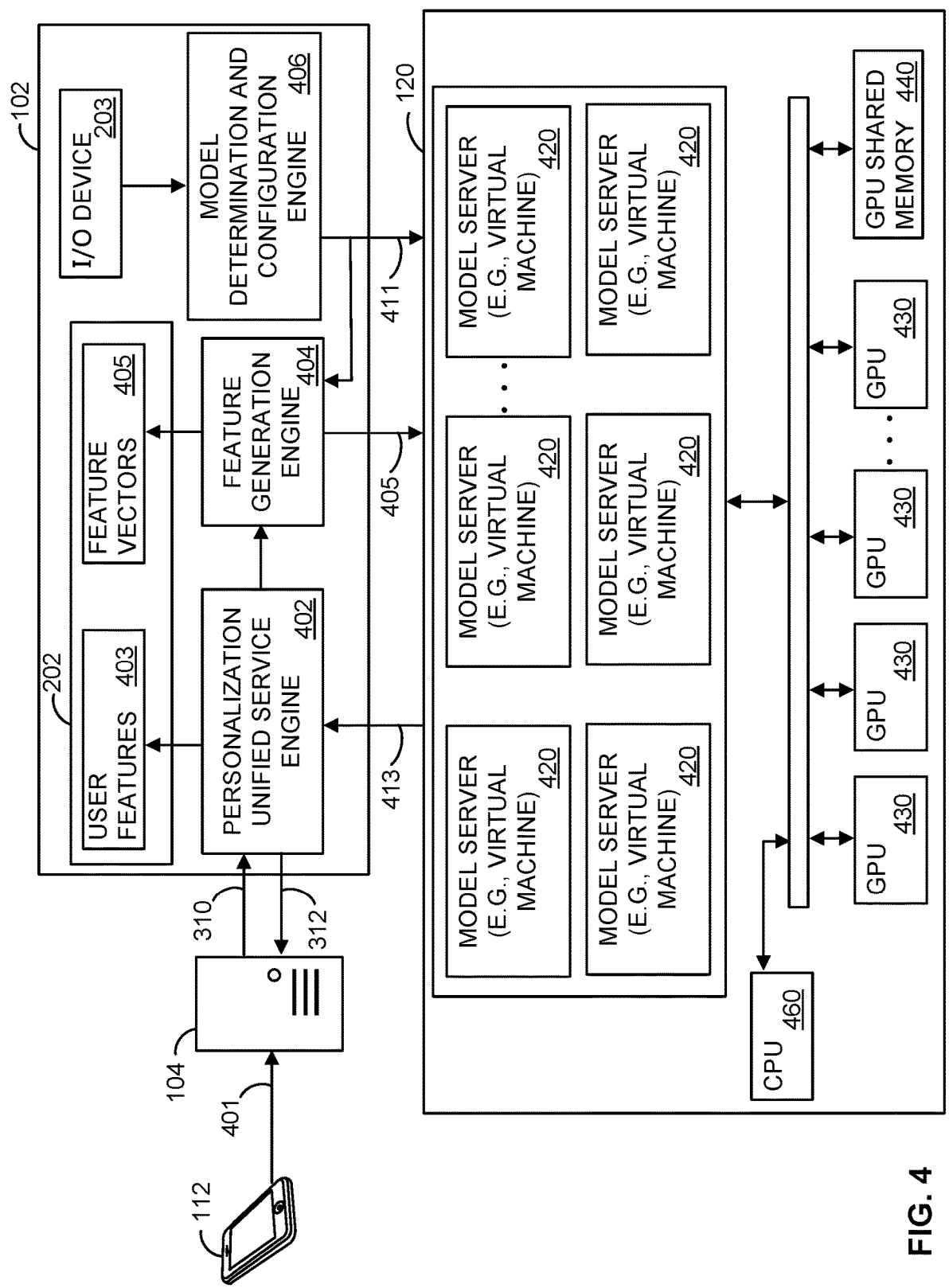
FIG. 4 is a block diagram illustrating various portions of the item recommendation system of FIG. 1 in accordance with some embodiments.

FIG. 4 illustrates exemplary portions of the item recommendation system 100 of FIG. 1. In this example, item recommendation computing device 102 includes personalization unified service engine 402, feature generation engine 404, and model determination configuration engine 406. In some examples, one or more of personalization unified service engine 402, feature generation engine 404, and model determination configuration engine 406 may be implemented in hardware. In some examples, one or more of personalization unified service engine 402, feature generation engine 404, and model determination configuration engine 406 may be as an executable program maintained in a tangible, non-transitory memory, such as instruction memory 207 of FIG. 2, that may be executed by one or processors, such as processor 201 of FIG. 2.

In addition, in this example processing device 120 includes a plurality of model servers 120 (e.g., virtual machines), where the plurality of model servers 120 have access to at least one CPU 460, and a plurality of shared GPUs 430. The plurality of shared GPUs can communication with each other and with CPU 460 over communication bus 435. Further, the CPU 460 and plurality of shared GPUs 430 have access to GPU shared memory 440, and may read data from, or write data to, GPU shared memory 440 over communication bus 435.

Model servers 420 can assign processing tasks to the plurality of shared GPUs 430. In some examples, one model server 420 can lock out other model servers 420 from assigning processing tasks to a GPU 430 using a locking mechanism, such as a lock flag. A processing task may be, for example, a machine learning model, such as first model 392, or any part thereof (e.g., a portion or subtask of first model 392).

Model determination and configuration engine 406 can configure each of a plurality of model servers 420 of a processing device 120 to execute one or more of the machine learning models, or parts thereof, and further configure each of the plurality of model servers 120 to employ one or more of the GPUs 430. For example, model determination and configuration engine 406 can provide model server configuration data 411 to configure the model servers 420. In some examples, model determination and configuration engine 406 provides model server configuration data 411 to configure a model server 420 to employ a plurality of GPUs 430 for execution of one or more machine learning models.

In some examples, model determination and configuration engine 406 provides model server configuration data 411 to configure the model servers 420 to execute inference of machine learning models in parallel. As a result, overall GPU 430 processing times (e.g., during inference) may be reduced, and GPU 430 "idle times" or "wait times" may be also reduced. For example, model determination and configuration engine 406 may cause a configuration of the GPUs 430 based on dependencies between input features required by each of the machine learning models and their outputs (e.g., output data). For example, model determination and configuration engine 406 may configure a model server 420 to employ a first GPU 430 and a second GPU 430. Further, assume that third model 396 requires, as input features, the output data of first model 392 and second model 394, and that the fourth model 397 requires the output data of the third model 396. Model determination and configuration engine 406 may configure the model server 420 to employ the first GPU 430 to execute the first model 392, and the second GPU 430 to execute the second model 394. Further, model determination and configuration engine 406 may configure the model server 420 to employ the first GPU 430 to execute the third model 396 when execution of the first model and the second model is complete, and to employ the second GPU 430 to execute the fourth model 397 when execution of the third model is complete.

For example, upon executing the first model 392, the first GPU 430 may generate first output data (e.g., first output tensors), and may store the first output data in GPU shared memory 440. Similarly, upon executing the second model 394, the second GPU may generate second output data (e.g., second output tensors), and store second output data in GPU shared memory 440. When the first GPU 430 is assigned the third model 396 for execution, the first GPU may obtain the first output data and the second output data from GPU shared memory 440, and may execute the third model 396 to generate third output data (e.g., third output tensors) based on the obtained first output data and the second output data. The first GPU 430 may then store the third output data in GPU shared memory 440, which may be obtained by the second GPU 430 when ready to execute the fourth model. Upon completing execution of the fourth model, the second GPU 430 may generate fourth output data (e.g., fourth output tensors), and store fourth output data in GPU shared memory 440.

Once machine learning model execution is complete, CPU 460 may obtain the output data from each executed machine learning model (also referred to herein as "model output data"), such as the first output data, second output data, third output data, and fourth output data, from GPU shared memory 440, and may provide the model output data to one or more of the model servers 420. The one or more model servers 420 may then provide the model output data 413 for each executed machine learning model (e.g., the first output data, second output data, third output data, and fourth output data described above) to personalization unified service engine 402.

In some examples, a user provides model server configuration data 411 to item recommendation computing device 102 using, for example, I/O device 203. The user may provide the model server configuration data 411 via a model server configuration interface (e.g., user interface, webpage) displayed by display 206. Model determination and configuration engine 406 may configure the model servers 420 based on the model server configuration data 411. For example, model server configuration data 411 may identify which model servers 420 will execute which machine learning models, and may further specify a GPU 430 configuration for each model server 420 (e.g., an assignment of GPUs 430 to each model server 420).

In this example, a customer activates a web browser of customer computing device 112, and directs the web browser (e.g., by entering in a web address) to a website provided by web server 104. As the customer interacts with the website, customer computing device 112 may transmit website activity data 401 identifying user actions and/or requests (e.g., clicks on a webpage, clicks on links to webpages of the website, input data provided by the customer, search queries, etc.). Web server 104 may generate user session data 320, including item engagement data 360, based on the received website activity data 401. For example, web server 104 may generate item clicks 324 and advertisement clicks 331 based on clicks identified by website activity data 401, and advertisements viewed 328 (e.g., impressions) based on the webpages of the website displayed to the customer by web server 104. Similarly, web server 104 may generate items added to cart 326 based on website activity data 401 identifying an instruction to add an item to an online shopping cart. Web server 104 may also generate search query data 330 based on website activity data 401 identifying search queries provided by the user (e.g., via a search bar of the website).

Web server may transmit the user session data 320, which may include portions of item engagement data and/or search query data 330, to item recommendation computing device 102, which is received by personalization unified service engine 402 (e.g., via transceiver 204). Personalization unified service engine 402 may generate user features 403 for the customer (e.g., as identified by a user ID 334 received in the user session data 320) based on the user session data 320, and may store the user features 403 in working memory 202. Personalization unified service engine 402 may further provide the user features 403 to feature generation engine 404.

Feature generation engine 404 generates feature vectors 405 for each of a plurality of machine learning models to be executed to generate item recommendations 312. For example, feature generation engine 404 may be configured to generate feature vectors 405 for each of first model 392, second model 394, third model 396, and fourth model 397. Feature generation engine 404 may store the feature vectors 405 in working memory 202, and may further provide the feature vectors to the model servers 420 based on the machine learning models, or parts thereof, each model server 420 has been assigned. For example, feature generation engine 404 may determine the feature vectors 405 to provide to each model server 420 based on model server configuration data 411. Each model server 420 may then provide the feature vectors 405 to a GPU 430 executing the corresponding machine learning model (or part thereof).

Personalization unified service engine 402 receives model output data 413 for each executed machine learning model. Personalization unified service engine 402 may combine the model output data 413 for each machine learning model to generate item recommendations 312. For example, personalization unified service engine 402 may apply a merging algorithm to the model output data 413 from the various machine learning models to generate combined model output data (e.g., output tensors representing the output of the merging algorithm). In some examples, personalization unified service engine 402 generates the item recommendations 312 based on the combined model output data. In some examples, personalization unified service engine 402 provides the combine model output data to at least one additional machine learning model, and generates the item recommendations 312 based on the output of the at least one additional machine learning model.

Figure 5:
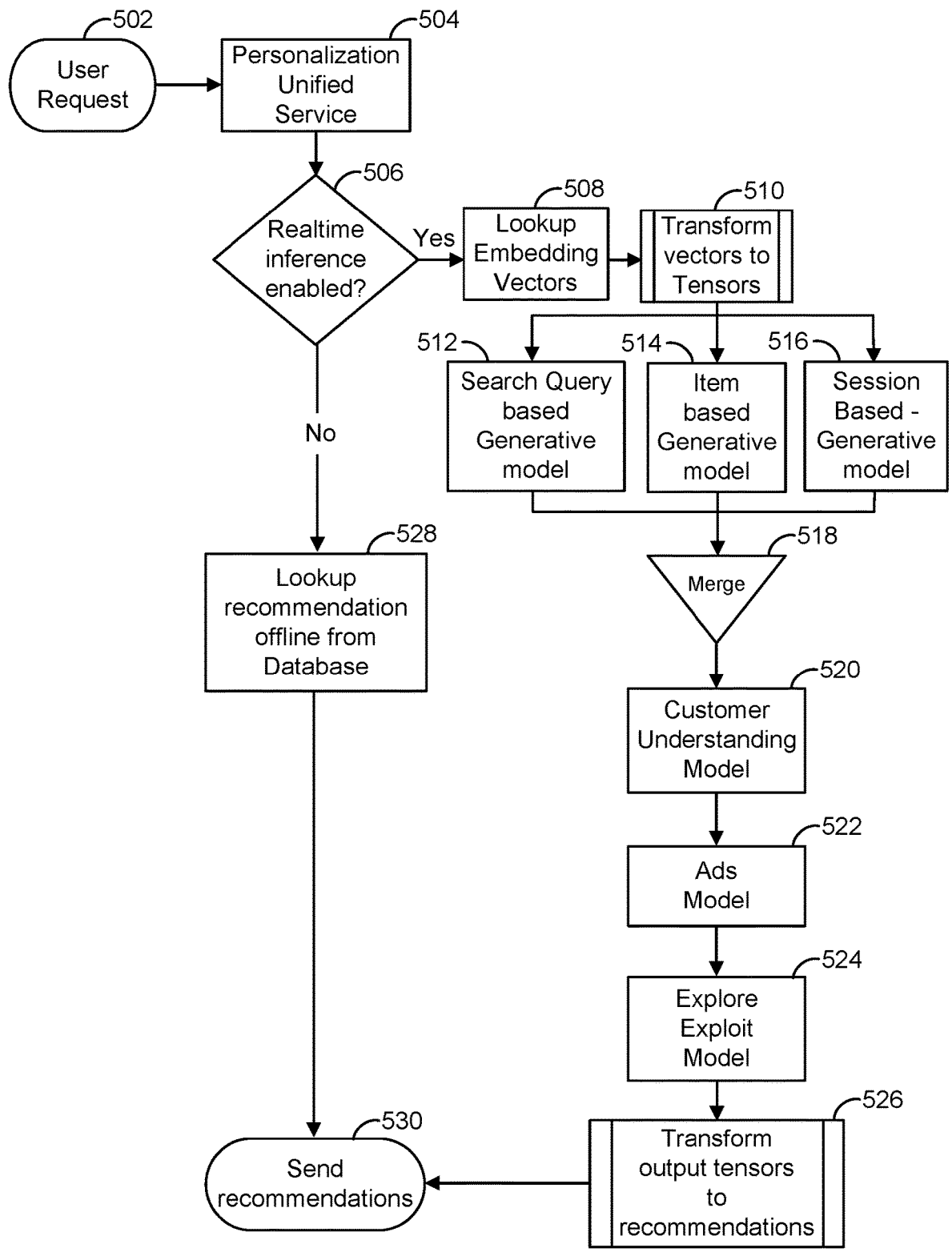
FIG. 5 illustrates a functional model that can be carried out by the item recommendation system of FIG. 1 in accordance with some embodiments.

FIG. 5 illustrates a functional model 500 that can be carried out by the item recommendation system 100 of FIG. 1. In this example, personalization unified service 504, which may be implemented by personalization unified service engine 402 of item recommendation computing device 102, may receive a user request 502. The user request 502 may be received from web server 104, and may identify a user (e.g., via a user ID 334) currently browsing a website, and may further identify user session data 320 for the user, for example. The personalization unified service 504 determines, at decision 506, whether real-time inference is enabled. For example, model server configuration data 411 may identify whether real-time inference is enabled. If real-time inference is not enabled, item recommendations for the user are obtained from a database, such as database 116, at block 528. The item recommendations are then sent to the web server at block 530.

If, however, real-time inference is enabled at decision 506, embedding vectors for one or more machine learning models are determined at block 508. In some examples, the embedding vectors (e.g., one dimensional arrays) are generated based on at least user session data identified in the user request 502. In some examples, the embedding vectors are obtained from a database, such as database 116. At block 510, the embedding vectors are transformed to tensors (e.g., multi-dimensional arrays), as is recognized in the art. Feature generation engine 404 may carry out blocks 508 and 510, for example.

The tensors are provided to each of a plurality of trained machine learning models according to their input expectations (e.g., requirements). For example, a first set of tensors may be provided to search query based generative model 512, a second set of tensors may be provide to item based generative model 514, and a third set of tensors may be provided to session based generative model 516. Each of the models may be assigned to processing units, such as a plurality of GPUs 430, that may execute the respective machine learning models in parallel.

Search query based generative model 512 may operate on tensors that include search query data 330 to generate probability values corresponding to recommended item or item types, for example. Item based generative model 514 may operate on tensors that include user transaction data 340 and/or catalog data 370 to generate probability values corresponding to recommended item or item types, for example. Session based generative model 516 may operate on tensors that include item engagement data 360 and/or catalog data 370 to generate probability values corresponding to recommended item or item types, for example.

At block 518, the output data from each of search query based generative model 512, item based generative model 514, and to session based generative model 516 are combined (e.g., merged). For example, a model server 420 or personalization unified service engine 402 may apply a corresponding weighting to each of the probability values output from each machine learning model 512, 514, 516, and may generate a combined output based on the weighted probability values according to a merging algorithm. In some examples, the merging algorithm averages probability values output from each model 512, 514, 516 that correspond to a same item or item type.

The combined output (e.g., output data, output tensors) from block 518 is provided (e.g., by a model server 420 or CPU 460) to another machine learning model, in this example customer understanding model 520. The customer understanding model 520 is executed by one or more processing units to generate customer understanding model output data, which is provided to an advertisement model 522. Advertisement model 522 is then executed by one or more processing units to generate ads model output data, which is then provided to an explore-exploit model 524. One or more processing units then execute the explore-exploit model to generate explore-exploit model output data.

In some examples, the customer understanding model 520 determines affinity of a customer towards a certain brand of items, price range of items, fulfillment type of items, etc. Based on these affinities, the customer understanding model 520 computes the affinity of the customer towards a certain item.

The advertisement model 522, in some examples, determines similarity of items from the ads pool to the items in the recall set. Using this model, advertisement items are blended/added into the recall set. In some examples, advertisement model 522 operates on the department/category/sub-category of ad items, brand of ad items, item name, etc. (e.g., catalog data 370), to determine the similarity of the items.

In some examples, the explore-exploit model 524 is reinforcement learning model that may operate on the click-through-rates (CTR) of items, and may determine the "goodness" of an item based on collective feedback. The explore-exploit model 524 may use an exploration technique for a new item, and eventually converges to an exploit phase depending on the "goodness" of the item.

At block 526, personalization unified service engine 402 transforms the output data (e.g., output tensors) from the explore-exploit model 524, and transforms the output data to item recommendations. For example, each value, or a range of values, as specified by the output data, may correspond to an item ID 371, or item type 373, of catalog data 370. Personalization unified service engine 402 may then transmit the item recommendations at block 530 to web server 104. Web server 104 may receive the item recommendations, and display item advertisements for the item recommendations on a website the user is browsing.

Figure 6:
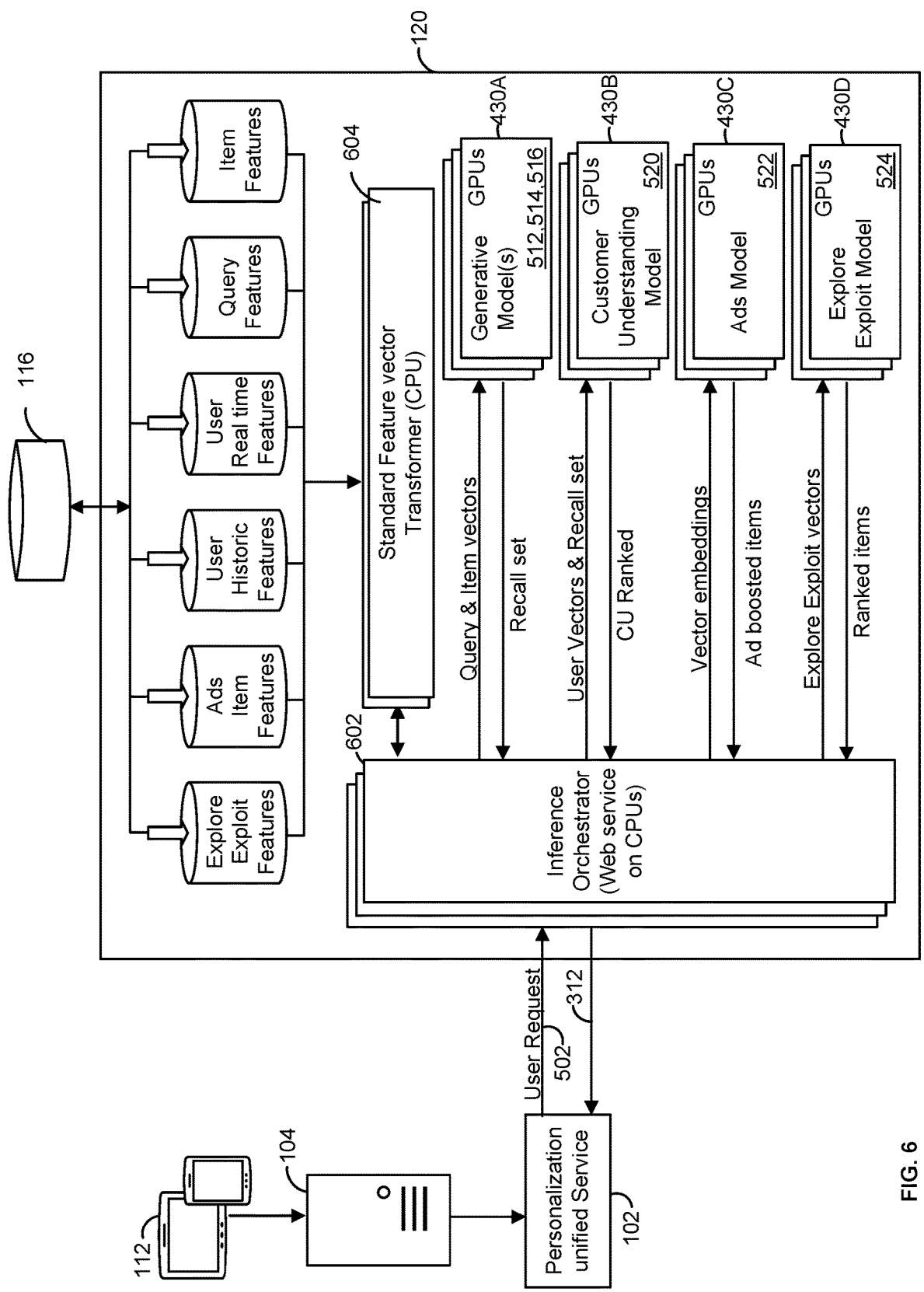
FIG. 6 is a block diagram illustrating various portions of the item recommendation system of FIG. 1 in accordance with some embodiments.

FIG. 6 illustrates exemplary portions of the item recommendation system 100 of FIG. 1. In this example, a user is browsing, via customer computing device 112, a website hosted by web server 104. The web server 104 transmits an indication of the user to item recommendation computing device 102. To generate item recommendations 312, item recommendation computing device 102 transmits a user request to processing device 120. The user request may be initiated by personalization unified service engine 402 executing a personalization unified service application, for example. The user request may identify the user.

As illustrated in this example, processing device 120 includes an inference orchestrator 602 and a standard feature vector transformer 604 whose functions, in some examples, are carried out by a CPU, such as CPU 460. Processing device 120 further includes a first set of GPUs 430a assigned to execute a plurality of generative models 512, 514, 516, a second set of GPUs 430b assigned to execute a customer understanding model 520, a third set of GPUs 430c assigned to execute an advertisement model 522, and a further set of GPUs 430d assigned to execute an explore-exploit model 524.

Inference orchestrator 602 receives the user request 502, and provides a signal to standard feature vector 604 that causes standard feature vector 604 to generate a plurality of feature vectors. The feature vectors that are generated are generated for each of the generative models 512, 514, 516, the customer understanding model 520, the advertisement model 522, and the explore-exploit model 524. For example, standard feature vector 604 may generate explore-exploit feature vectors based on explore-exploit features for explore-exploit model 524. Similarly, standard feature vector 604 may generate advertisements item feature vectors based on advertisements item features for advertisement model 522. As another example, standard feature vector 604 may generate query feature vectors and item feature vectors based on query features and item features, respectively, for the generative models 512, 514, 516. Standard feature vector transformer 604 may similarly generate customer understanding feature vectors for customer understanding model 520.

In this example, assume that the generative models 512, 514, 516 are not reliant on the output of any other machine learning model. In addition, assume that the customer understanding model 520 relies on the output data (e.g., recall set) of at least one of the generative models 512, 514, 516. Further, assume that the advertisements model 522 is reliant on the output data (e.g., CU ranked list) of the customer understanding model 520, and that the explore-exploit model is reliant on the output data (e.g., ad boosted items) of the advertisements model 522.

As such, the first set of GPUs 430a may execute the generative models 512, 514, 516 in parallel, as they only operate on the above noted feature vectors. The second set of GPUs 430b may execute the customer understanding model 520 when the first set of GPUs 430a provide the output data of each of the generative models 512, 514, 516, as the customer understanding model 520 requires their output as an input. The third set of GPUs 430c may execute the advertisement model 522 after receiving the output data of the customer understanding model 520, and the fourth set of GPUs 430d may execute the explore-exploit model 524 after receiving the output data from the advertisements model 522.

Once the fourth set of GPUs 430d completes execution of the explore-exploit model 524, the fourth set of GPUs 430 provides a final list of ranked items to inference orchestrator 602. Inference orchestrator 602 then generates the item recommendations 312 based on the ranked list from the explore-exploit model 524, as well as on the recall sets from the generative models 512, 514, 516, the CU ranked list from the customer understanding model 520, and the ad boosted items from the advertisements model 522. For example, Inference orchestrator 602 may execute a merging algorithm to generate the item recommendations 312. Inference orchestrator 602 then transmits the item recommendations 312 to item recommendation computing device 102.

Figure 7:
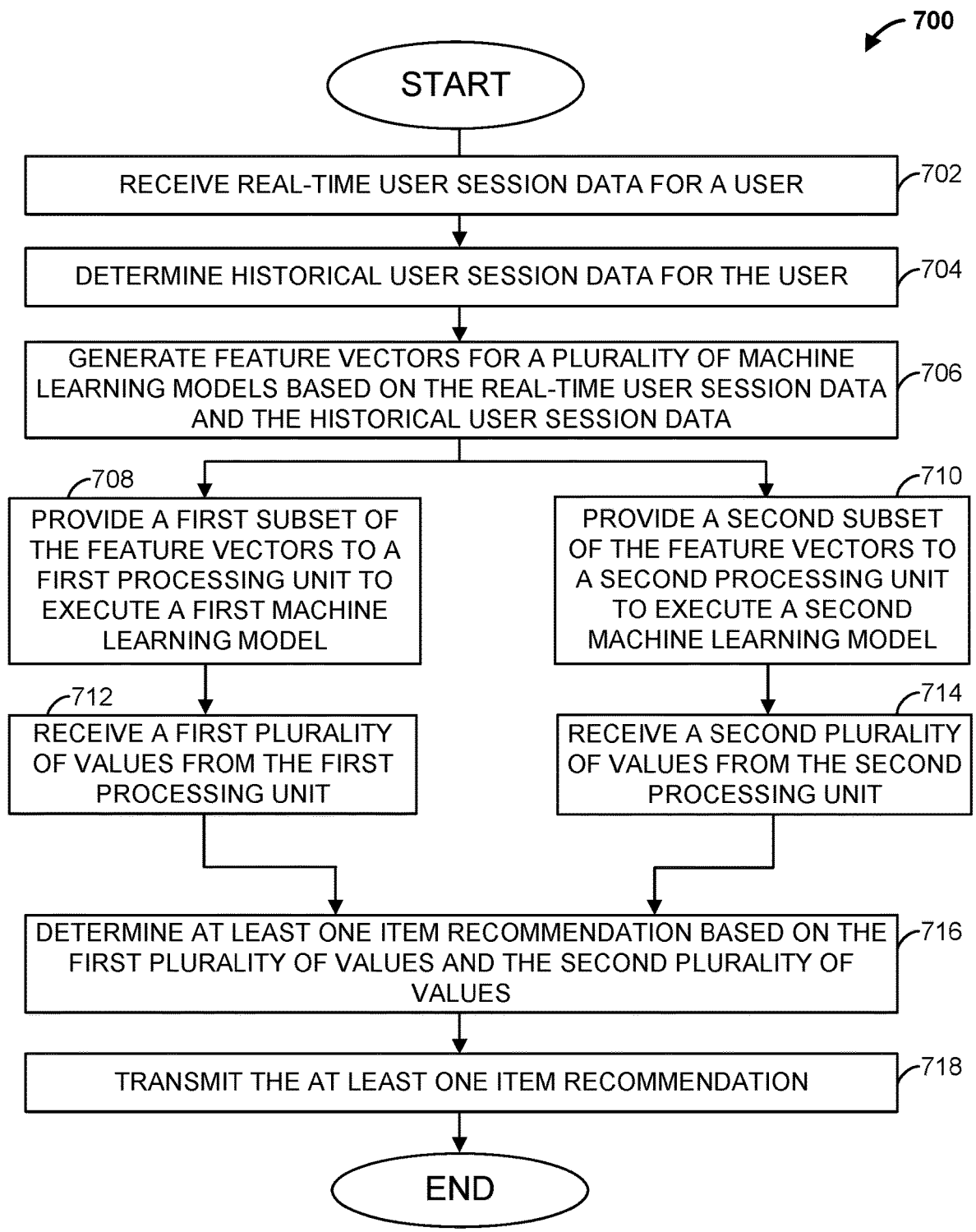
FIG. 7 is a flowchart of an example method that can be carried out by the item recommendation computing device of FIG. 1 in accordance with some embodiments.

FIG. 7 is a flowchart of an example method 700 that can be carried out by a computing device, such as the item recommendation computing device 102 of FIG. 1. Beginning at step 702, real-time user session data for a user is received. For example, item recommendation computing device 102 may receive user session data 320 for a user from web server 104. At step 704, historical user session data for the user is determined. For example, item recommendation computing device 102 may obtain the historical user session data for the user from database 116, which stores historical user session data for a plurality of users. At step 706, feature vectors for a plurality of machine learning models. The feature vectors are generated based on the real-time user session data, and the historical session user data, for the user. For example, feature generation engine 404 may generate a first set of feature vectors for a first machine learning model, and a second set of feature vectors for a second machine learning model.

The method then proceeds to steps 708 and 710. At step 708, a first subset of the feature vectors is provided to a first processing unit (e.g., a first GPU 430) to execute a first machine learning model. At step 710, a second subset of the feature vectors is provided to a second processing unit (e.g., a second GPU 430) to execute a second machine learning mode. Execution of the first machine learning model and the second machine learning model may be in parallel, for example.

From step 708, the method proceeds to step 712, where a first plurality of values is received from the first processing unit. Similarly, from step 710, the method proceeds to step 714, where a second plurality of values is received from the second processing unit. From steps 712 and 714, the method proceeds to step 716, where at least one item recommendation is determined based on the first plurality of values and the second plurality of values. For example, item recommendation computing device 102 may execute a merging algorithm to combine the first plurality of values and the second plurality of values, and may determine the at least one item recommendation based on the output of the merging algorithm.

The method then proceeds to step 718, where the at least one item recommendation is transmitted. For example, item recommendation computing device 102 may transmit the at least one item recommendation to web server 104. Web server 104 may display one or more advertisements for the recommended items to the user. The method then ends.

Figure 8:
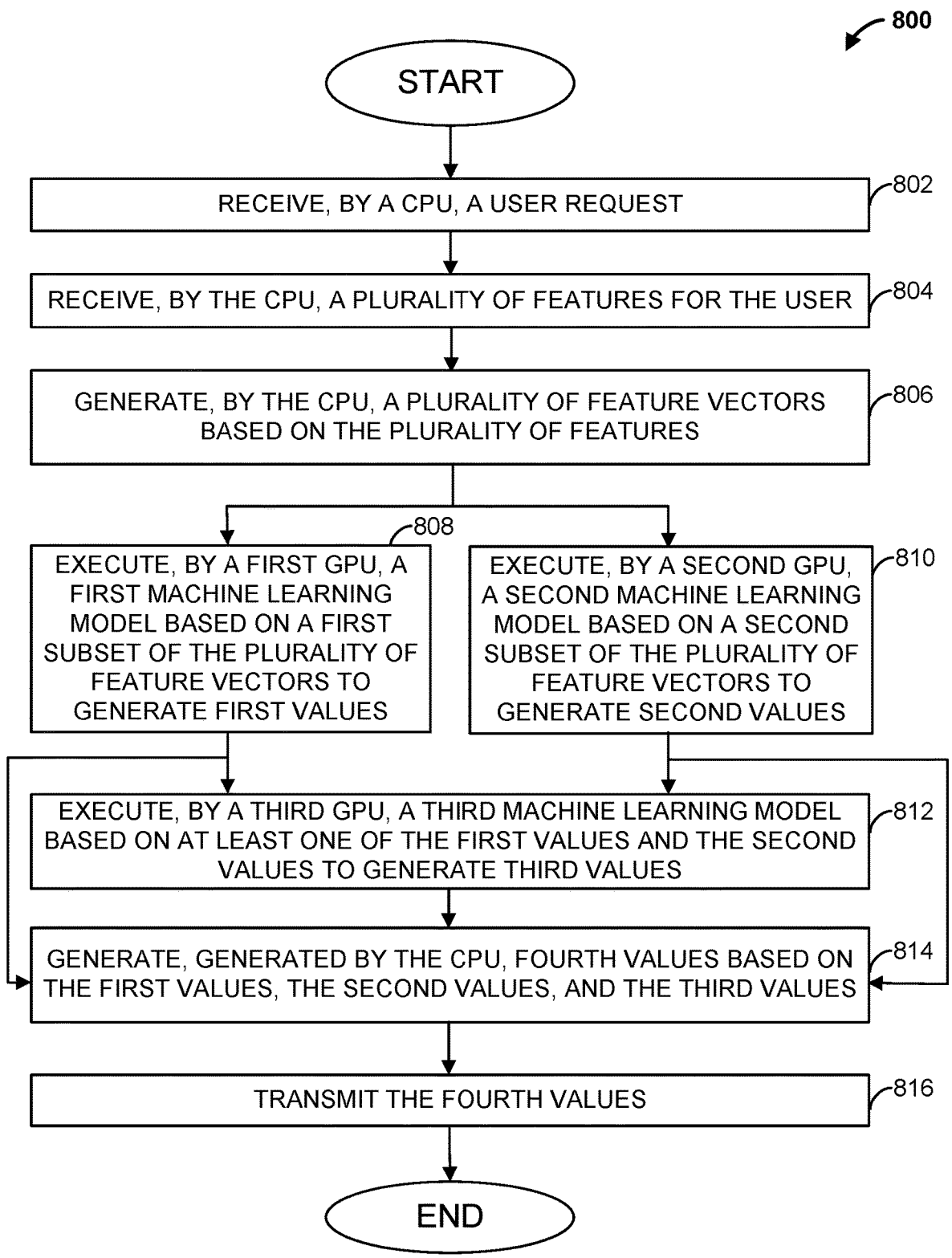
FIG. 8 is a flowchart of another example method that can be carried out by the item recommendation computing device of FIG. 1 in accordance with some embodiments.

FIG. 8 is a flowchart of an example method 800 that can be carried out by a computing device, such as processing device 120 of FIG. 1. Beginning at step 800, a user request, such as user request 502, is received by a CPU, such as CPU 460. At step 804, the CPU receives a plurality of features for the user. For example, the CPU may obtain the plurality of features for the user from database 116, and the plurality of features may include one or more of explore-exploit features, advertisement item features, user historic features, user real-time features, query features, and item features. At step 806, the CPU generates a plurality of feature vectors based on the plurality of features.

The method then proceeds to steps 808 and 810, which may be performed simultaneously (or nearly simultaneously, as allowed by CPU and GPU processing). At step 808, a first GPU (e.g., first GPU 430) executes a first machine learning model (e.g., search query based generative model 512) based on a first subset of the plurality of feature vectors (e.g., query features) to generate first values. At step 810, a second GPU (e.g., second GPU 430) executes a second machine learning model (e.g., item based generative model 514) based on a second subset of the plurality of feature vectors (e.g., item features) to generate second values.

From steps 808 and 810, the method proceeds to step 812, where a third GPU (e.g., third GPU 430) executes a third machine learning model (e.g., customer understanding model 520) based on at least one of the first values and the second values to generate third values. The method then proceeds to step 814, where the CPU generates fourth values based on the first values, second values, and third values. For example, the CPU may execute a merging algorithm to generate the fourth values.

The method then proceeds to step 816, where the fourth values are transmitted. The fourth values may identify probabilities corresponding to items or item types, for example. Processing device 120 may transmit the fourth values to item recommendation computing device 102, which may then determine item recommendations based on the fourth values, for example. The method then ends.

In some embodiments, a system comprising a first processing unit communicatively coupled to a second processing unit and a third processing unit. The first processing unit configured to receive user session data identifying website activities of a user from a web server, and generate feature data based on at least the user session data for the user. The first processing unit is also configured to provide a first portion of the feature data to the second processing unit, where the second processing unit is configured to generate first output data based on the first portion of the feature data. Further, the first processing unit is configured to provide a second portion of the feature data to the third processing unit, where the third processing unit is configured to generate second output data based on the second portion of the feature data. The first processing unit is also configured to receive the first output data from the second processing unit, and receive the second output data from the third processing unit. The first processing unit is further configured to generate item recommendations based on the first output data and the second output data. The first processing unit is also configured to transmit the item recommendations to the web server.

In some embodiments, a method by a first processing unit includes receiving user session data identifying website activities of a user from a web server, and generating feature data based on at least the user session data for the user. The method also includes providing a first portion of the feature data to a second processing unit, where the second processing unit is configured to generate first output data based on the first portion of the feature data. The method further includes providing a second portion of the feature data to a third processing unit, where the third processing unit is configured to generate second output data based on the second portion of the feature data. The method further includes receiving the first output data from the second processing unit, and receiving the second output data from the third processing unit. The method also includes generating item recommendations based on the first output data and the second output data. The method further includes transmitting the item recommendations to the web server.

In yet other embodiments, a non-transitory computer readable medium has instructions stored thereon, where the instructions, when executed by at least one processor, cause a computing device to perform operations that include receiving user session data identifying website activities of a user from a web server, and generating feature data based on at least the user session data for the user. The operations also include providing a first portion of the feature data to a second processing unit, where the second processing unit is configured to generate first output data based on the first portion of the feature data. The operations further include providing a second portion of the feature data to a third processing unit, where the third processing unit is configured to generate second output data based on the second portion of the feature data. The operations further include receiving the first output data from the second processing unit, and receiving the second output data from the third processing unit. The operations also include generating item recommendations based on the first output data and the second output data. The operations further include transmitting the item recommendations to the web server.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a processing unit configured to:
receive user session data identifying website activities of a user from a web server;
generate feature data based on at least the user session data for the user;
provide a first portion of the feature data to a second processing unit;
assign a first machine learning model to the second processing unit for execution to generate first output data based on the first portion of the feature data;
provide a second portion of the feature data to a third processing unit;
assign a second machine learning model to the third processing unit for execution to generate second output data based on the second portion of the feature data;
receive the first output data from the second processing unit;
receive the second output data from the third processing unit;
generate item recommendations based on the first output data and the second output data; and
transmit the item recommendations to the web server.

2. The system of claim 1, wherein:
the processing unit has a first type of architecture;
the second processing unit has a second type of architecture; and
the third processing unit has the second type of architecture.

3. The system of claim 2, wherein the second processing unit and the third processing unit are configured to execute at least a portion of the first machine learning model and at least a portion of the second machine learning model, respectively, in parallel.

4. The system of claim 2, wherein each of the first machine learning model and the second machine learning model are generative models.

5. The system of claim 1, wherein the item recommendations are generated based on:
executing a merging algorithm based on the first output data and the second output data to generate third output data; and
generating the item recommendations based on the third output data.

6. The system of claim 1, wherein the processing unit is a central processing unit (CPU), and each of the at least one different processing unit is a graphical processing unit (GPU).

7. The system of claim 1, wherein the processing unit is configured to provide the first output data and the second output data to the second processing unit for execution of a third machine learning model to generate third output data, and wherein the item recommendations are generated based on the third output data.

8. The system of claim 7, wherein
the processing unit is configured to
assign the third machine learning model to the second processing unit when the first output data and the second output data have been generated.

9. The system of claim 8, wherein the processing unit is configured to execute the assignments based on configuration data stored in a database, wherein the configuration data identifies input requirements for each of the first machine learning model, the second machine learning model, and the third machine learning model.

10. A method by a processing unit comprising:
receiving user session data identifying website activities of a user from a web server;
generating feature data based on at least the user session data for the user;
providing a first portion of the feature data to a second processing unit;
assigning a first machine learning model to the second processing unit for execution to generate first output data based on the first portion of the feature data;
providing a second portion of the feature data to a third processing unit;
assigning a second machine learning model to the third processing unit for execution to generate second output data based on the second portion of the feature data;
receiving the first output data from the second processing unit;
receiving the second output data from the third processing unit;
generating item recommendations based on the first output data and the second output data; and
transmitting the item recommendations to the web server.

11. The method of claim 10, wherein:
the first machine learning model and the second machine learning model are assigned based on configuration data stored in a database; and the configuration data identifies input requirements for each of the first machine learning model and the second machine learning model.

12. The method of claim 11, further comprising causing the second processing unit and the third processing unit to execute at least a portion of the first machine learning model and at least a portion of the second machine learning model in parallel.

13. The method of claim 10, wherein generating the item recommendations comprises:
   executing a merging algorithm based on the first output data and the second output data to generate third output data; and
   generating the item recommendations based on the third output data.

14. The method of claim 10, wherein the processing unit is a central processing unit (CPU), and each of the at least one different processing unit is a graphical processing unit (GPU).

15. The method of claim 10, further comprising providing the first output data and the second output data to the second processing unit for execution of a third machine learning model to generate third output data, and wherein generating the item recommendations is based on the third output data.

16. A non-transitory computer readable medium having instructions stored thereon, wherein the instructions, when executed by at least one processor, cause a device to perform operations comprising:
   receiving user session data identifying website activities of a user from a web server;
   generating feature data based on at least the user session data for the user;
   providing a first portion of the feature data to a second processing unit;
   assigning a first machine learning model to the second processing unit for execution to generate first output data based on the first portion of the feature data;
   providing a second portion of the feature data to a third processing unit;
   assigning a second machine learning model to the third processing unit for execution to generate second output data based on the second portion of the feature data;
   receiving the first output data from the second processing unit;
   receiving the second output data from the third processing unit;
   generating item recommendations based on the first output data and the second output data; and
   transmitting the item recommendations to the web server.

17. The non-transitory computer readable medium of claim 16, wherein:
   the first machine learning model and the second machine learning model are assigned based on configuration data stored in a database; and
   the configuration data identifies input requirements for each of the first machine learning model and the second machine learning model.

18. The non-transitory computer readable medium of claim 17, wherein the instructions, when executed by the at least one processor, further cause the device to perform operations comprising causing the second processing unit and the third processing unit to execute at least a portion of the first machine learning model and at least a portion of the second machine learning model in parallel.

19. The non-transitory computer readable medium of claim 16, wherein the instructions, when executed by the at least one processor, further cause the device to perform operations comprising:
   executing a merging algorithm based on the first output data and the second output data to generate third output data; and
   generating the item recommendations based on the third output data.

20. The non-transitory computer readable medium of claim 16, wherein the instructions, when executed by the at least one processor, further cause the device to perform operations comprising providing the first output data and the second output data to the second processing unit for execution of a third machine learning model to generate third output data, and wherein generating the item recommendations is based on the third output data.

* * * * *